Figure 1:
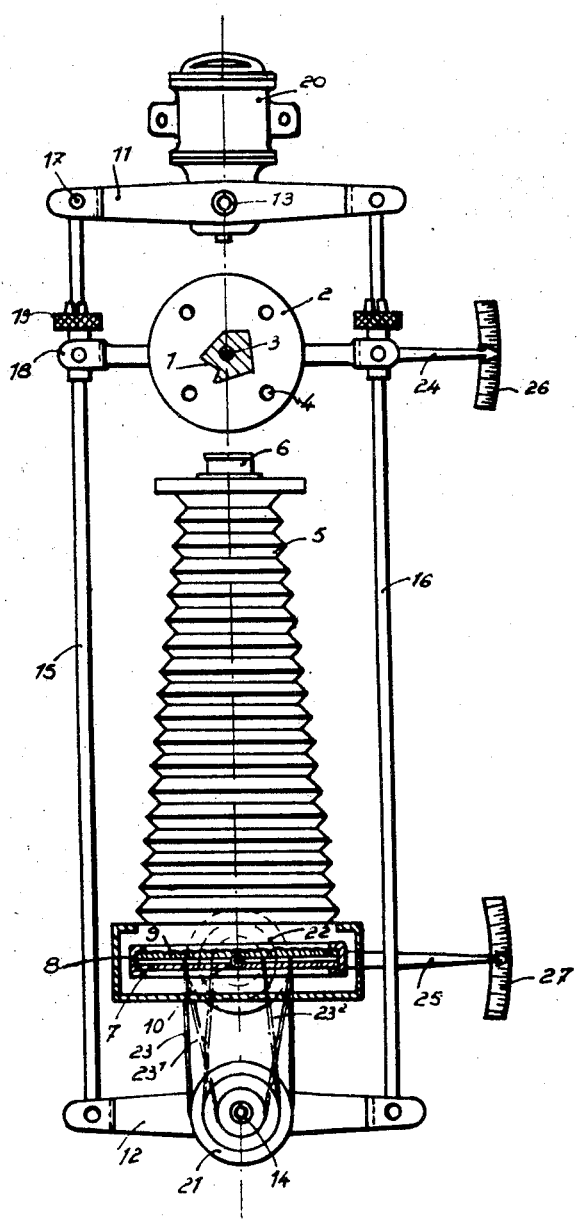

Dec. 27, 1949 — M. BONNET — 2,492,520
DEVICE FOR OBTAINING PERISTEREOSCOPIC MACROPHOTOGRAPHS AND X-RAY PHOTOGRAPHS
Filed Oct. 25, 1945 — 2 Sheets-Sheet 1

Inventor
MAURICE BONNET
By Haseltine, Lake & Co.
Attorneys

Dec. 27, 1949 M. BONNET 2,492,520
DEVICE FOR OBTAINING PERISTEREOSCOPIC MACROPHOTOGRAPHS
AND X-RAY PHOTOGRAPHS
Filed Oct. 25, 1945 2 Sheets-Sheet 2

Inventor
MAURICE BONNET

Patented Dec. 27, 1949

2,492,520

UNITED STATES PATENT OFFICE 2,492,520

DEVICE FOR OBTAINING PERISTEREOSCOPIC MACROPHOTOGRAPHS AND X-RAY PHOTOGRAPHS

Maurice Bonnet, Paris, France, assignor to La Reliephographie, Societe pour l'Exploitation des Procedes de Photographie en relief Maurice Bonnet, Paris, France, a corporation of France Application October 25, 1945, Serial No. 624,561
In France October 13, 1941

Section 1, Public Law 690, August 8, 1946
Patent expires October 13, 1961

14 Claims. (Cl. 88—24)

Certain processes for obtaining peri-stereoscopic images are known, for the application of which the entire camera moves relatively to the fixed subject, the luminous rays impressing the sensitive plate after passing through the lens and a selecting screen or so-called selectograph.

The term "selectograph" is chosen for designating those selecting, lenticular, or optical selecting screens, known per se, which are used for recording images.

The term "selectoscope," on the contrary, designates those screens which are used for viewing images.

Various devices have been proposed for the application of the said processes. They must comprise definite mechanical means ensuring a uniform movement of the plate, the selectograph and the optical system, in a rigorously horizontal plane, relatively to the fixed subject.

It will be understood that when macrophotographs in relief, taken with a considerable enlargement, are to be obtained, the mobility of the entire apparatus renders the steadiness during the recording movement of the image precarious, and that the sharpness of the photographs is thereby affected.

Instead of providing complicated and expensive devices ensuring perfect guiding, an attempt has now been made to find out what were the elements the lack of steadiness of which was the most prejudicial, and what were those the suitable guiding of which could be the most easily obtained.

The present invention relates to a device obtained as a consequence of this study, and particularly well adapted, although not exclusively, to be used for obtaining greatly enlarged peristereoscopic images of small objects. One of its main features consists in the fact that it comprises a fixed optical system, thus offering all the desirable stability.

For recording the succession of elementary images of the object, taken under various angles, according to the processes mentioned, instead of imparting a common motion of translation along a rectilinear or curved path to the optical system including the selectograph and the photographic plate, the simple method has been devised of imparting rotation on the one hand to the object, and on the other hand to the plate combined with the selectograph. It will be understood that these movements of rotation about an axis can be obtained more simply and accurately than the general movement of translation previously produced, especially as the objects to be photographed, the selectograph and the plate are most often of relatively light weight.

According to another feature of the invention, the movement of rotation of the object, and that of the plate-carrying frame which also contains the selectograph, are combined by means of a variable mechanical connecting device, so as to modify the amplitude and/or the direction of rotation of the frame relatively to that of the object. In fact, it is evident from the optical properties of the selective lenticular screens that the rotations of these two elements (object and frame) through equal angles and in the same direction enable photographs to be obtained giving true relief and proportional to the dimension of the image, whereas the rotation of the object through an angle larger or smaller than that imparted to the frame enables photographs to be obtained, the relief of which is exaggerated or attenuated respectively.

These variable means for controlling the relative movements of the object on the one hand, and the selectograph-plate unit on the other hand impart a very large field of applications to the device according to the invention, among which, in addition of course to direct photography, the following may be cited:

(1) Printing by projecting the negatives of parallactic photographs (in relief, coloured or animated) either in the same dimension, or enlarged, or reduced;

(2) Direct photography, and inverted printing in relief (pseudomorphous) of negatives obtained in true relief, with a view to producing positives for projection;

(3) Printing in natural relief of negatives presenting pseudomorphous relief;

(4) Printing in attenuated relief (anamorphosis) of negatives giving true relief;

(5) Printing of goffered films (in relief or coloured);

(6) Printing of proofs without relief from negatives in relief;

(7) Printing of photographs with or without relief, from negative goffered films;

(8) Printing of positive proofs combined with goffered screens having optical features different from those of the screen belonging to the negative;

(9) X-ray photography in relief, by combining a Röntgen lamp and a fluorescent screen with the photographic device described.

These various applications will be mentioned again later on, when explaining the operation of the apparatus.

Figure 2:
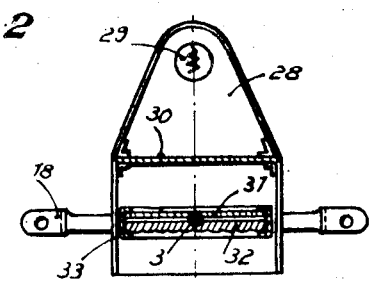
Figure 3:
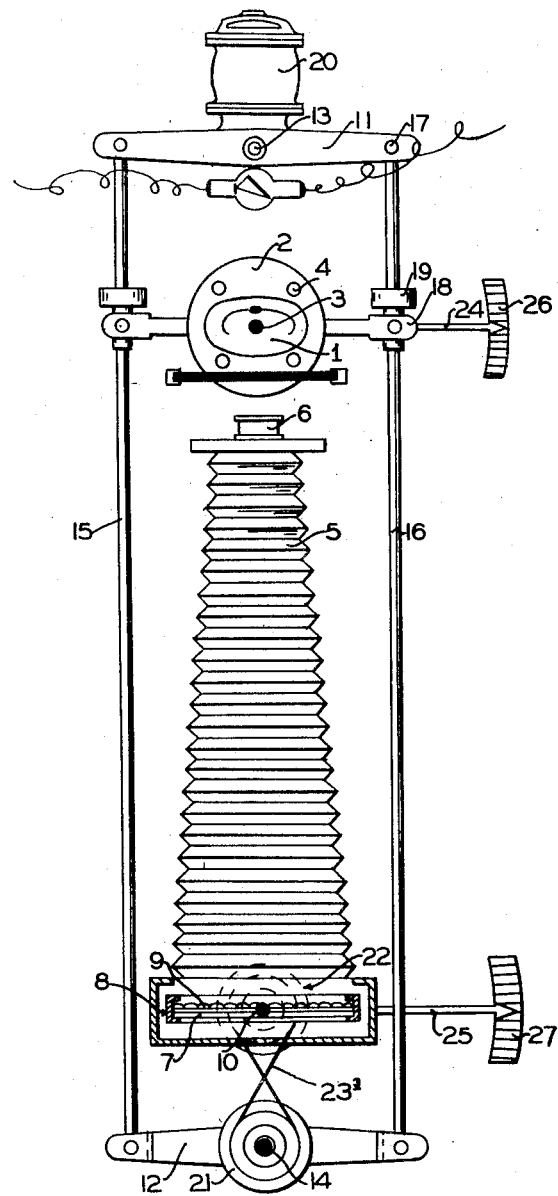

Apparatus devised according to the invention is illustrated, by way of example, in the accompanying drawings, in which:

Figure 1 gives a diagrammatic plan view of the camera;

Figure 2 shows this device converted into a printer and Figure 3 shows the camera in use for radiostereoscopy.

It is evident that the device shown is very rudimentary and only constitutes an experimental form of construction, which however enables all the above-mentioned operations to be carried out.

In Figure 1, 1 denotes the object of which a peri-stereoscopic image is to be taken and greatly enlarged. This object is secured in any convenient manner on a supporting plate 2, rotating about a vertical spindle 3. The object-carrier 2 is provided with means 4 for securing suitable luminous sources (projectors, condensers, etc.) arranged according to requirements. The rotation of the object during recording does not, in fact, allow of mounting the lighting means on the fixed frame of the apparatus, owing to the movement of shadows which would then be caused.

To the photographic chamber 5 of the camera is secured the lens 6, which projects the image of the object in the plane of the sensitive plate 7, at the distance corresponding to the desired enlargement ratio. The plate is placed in a frame 8, also carrying the known selectograph 9, and rotating about a spindle 10 parallel to spindle 3.

The device rendering the object and the frame rotationally rigid together is here constituted by a parallel motion, formed by two rocking levers 11 and 12, rotating about vertical spindles 13 and 14 in the same plane as the spindles 3 and 10. The parallel motion is completed by two rods 15 and 16, which are pivoted at 17 to the rocking levers. On the rods 15 and 16 can slide a third rocking lever 18, through the medium of fork members capable of being locked at any point of the rods by turning milled knobs 19. The plate 2 and the spindle 3 are rotationally rigid with the rocking lever 18.

The spindle 10 actuating the frame 8 is in its turn rotated through the medium of a transmission to be described later on.

An electric motor 20 with reducing gear enables the rocking lever 11 to be rotated at a very slow speed about the spindle 13. This rotation is transmitted to the rocking levers 18 and 12 through the medium of the rods 15 and 16.

As mentioned, the spindle 10 is driven from the spindle 14 through the medium of a variable transmission, which is constituted, in the example illustrated, by two sets of stepped pulleys 21 and 22, which may be connected by a belt 23, which is capable of being mounted on the corresponding pulleys of both sets, and which may be crossed. By this means there can be imparted to the selectograph 9 and the plate 7 a rotation which is of an amplitude equal to, or greater or smaller than or the reverse of that which has been transmitted to the spindle 14, the latter rotation being in its turn equal to that imparted to the rocking-lever 11 by the motor 20.

The rotations of the object 1 and of the frame 8 can be measured for instance by means of pointers 24 and 25, moving over graduated scales 26 and 27.

In Figure 2, the device is illustrated as being used for converting into a printer the apparatus for taking direct photographs shown in Figure 1. It consists in a light box 28 of any type, containing a source of light 29 and a ground-glass plate 30. The negative 31 and the selectograph 32 rigid therewith are placed in a frame 33 similar to the frame 8, and can be held stationary at various depths within the box 28. The whole is substituted for the object-carrying plate 2, and therefore rotates about the spindle 3.

The operation of the apparatus will now be described by successively examining the various cases of utilisation that have been previously mentioned.

*Direct photographs.*—In all cases of utilisation, the plate 7 and the selectograph 9 must rotate through an angle corresponding to the opening angle of the refracting lenses of the selectograph, so as to exactly cover, when impressing, the band of emulsion which is placed behind each lens. It is therefore to the object-carrier 2 or the negative-carrier 28 that a rotation according to a different angle will have to be imparted.

If the object 1 is to be reproduced in natural relief, the belt 23 will be mounted on pulleys of equal diameter, without being crossed. Conditions of rotation of equal value and of the same direction will thus be obtained for the object and for the negative. The view will be taken by interrupting the exposure after the index needle 24 or 25 has marked on the scale 26 or 27, from a point of origin, an angle of rotation corresponding to the opening angle of the lenses of the selectograph.

If the relief of the photograph obtained is to be exaggerated, the belt 23' must be mounted, before the view is taken, on a pulley of the set 22 having a diameter larger than that of the pulley corresponding to the set 21. In this manner, for a rotation of the spindle 10 equal to the opening angle of the lenses of the selectograph, a rotation of the spindle 14, and consequently of the spindle 3, is obtained, through a larger angle, the object itself being thus seen on a larger portion of its surface.

Conversely, a rotation of the spindle 3 smaller than that imparted to the spindle 10 will give a photograph presenting attenuated relief. For that purpose, the belt is mounted as indicated at $23^2$.

(1) *Printing negatives by projection.*—The object-carrying plate is replaced by the lighting box 28 illustrated in Figure 2. Everything takes place as for direct view-taking both for printing in the same dimensions and for enlargement or reduction of the negative.

A larger or smaller portion of the object can be caused at will to appear to project out of the plane of the support of the direct photograph, by displacing the latter on the plate 2, all the points of the object located between the lens 6 and the spindle 3 coming to the front on the image, and all those located beyond the said spindle appearing behind the said plane. Similarly, by displacing the frame 33 within the box 28, prints of a given negative can also be obtained in which the object will be correspondingly offset relatively to the plane of the support of the image.

(2) *Direct photography and printing in pseudomorphous relief.*—Pseudomorphous relief is obtained by virtue of the optical properties of the lenticular selectograph, all the conditions remaining moreover the same as previously, by crossing the belt 23 before mounting it on the chosen pulleys, as indicated at $23^3$. The sweeping of the emulsion by the luminous beam issuing from each of the lenses then takes place in the reverse direction. In the preceding case, the direction of sweeping was such that the inversion of each of the elementary images was obtained, giving natural relief. Such inversion is lacking now, and pseudomorphous relief is thus obtained.

(3) *Printing in natural relief from negatives in pseudomorphous relief.*—The case of this application is identical with the preceding one; if the negative to be printed is in pseudomorphous relief, the proof obtained in the same conditions will give natural relief.

(4) *Printing in attenuated relief (anamorphous) of negatives giving true relief.*—The belt is again mounted on a pulley of the set 21 having a diameter smaller than the pulley corresponding to the set 22, as already indicated at 23'. Owing to the reduced rotation of the spindle 3 relatively to that imparted to the spindle 10, the plate 7 then records simply a portion of the images contained in the negative to be printed. Everything takes place as in the case of direct photography, and as if the object was seen only from a basis shorter than that for view-taking.

Printing effected in these conditions moreover renders it possible to eliminate the extreme or marginal elementary images given by each lens of the selectograph belonging to the negative, which tend to become mingled with those given by the adjacent lenses.

(5) *Printing of goffered films.*—For each image of the film, this operation is identical with the printing of a photograph. Goffered negative films, like goffered positive films, must therefore rotate, at each view, through an angle equal to the opening angle of the lenses of the goffering. For that purpose they will be suitably guided in oscillating passages. The mechanisms for guiding the films and periodically obturating the source of light for printing are not included in the scope of the invention, and will not be described herein in detail.

(6) *Printing of proofs without relief from negatives in relief.*—The elementary images respectively recorded in all the bands of emulsion which correspond to the width of the lenses of the goffered selective screen reconstitute together, for the observer, a complete image of the subject, at each point of rotation of the negative with the box 28.

Each of said reconstituted images can therefore be photographed on a plate or on paper, and on any scale whatever, by holding stationary, at the required point of its path, the negative provided with its selector. The device then functions exactly as an ordinary projection apparatus.

(7) *Printing photographs with or without relief, from goffered negative films.*—This case is connected with the preceding case and with case 1, only one of the images of the negative film, stopped at the required point in its guiding passage, being then considered.

(8) *Printing proofs comprising selectors different from that of the negative.*—When selectors of different features are used for the negative and the positive emulsion support, these selectors comprising lenses the opening angle of which is also different, the variable transmission provided according to the invention allows of easily adapting the relative rotations of these two elements to the requirements of their respective gofferings.

(9) *X-ray photography in relief.*—The photographic device which has been contemplated up to now may be converted, according to the invention, into a device for taking X-ray photographs in relief, operating according to the principle set forth in the French patent application dated June 12, 1944, for "Process and devices for obtaining X-ray photographs in relief."

For that purpose, as shown in Figure 3, the source of light 29 is replaced by a Röntgen lamp, and the negative 31, with its selectograph 32, by the subject to be X-rayed. A fluorescent radioscopy screen is interposed between the lens and the subject in immediate proximity to the latter, but so as not to participate in the rotation of the plate 2.

The transmission belt 23, on the other hand is placed in the position indicated by $23^3$, which corresponds to the reversal of the direction of rotation adopted for obtaining normal peri-stereoscopic images.

Such reversal is indispensable for obtaining X-ray photographs giving exact relief, as it must be considered that in this particular application, the image must reproduce the aspect of the subject as seen by the lamp, and not the aspect of the subject as seen by the lens.

Failing this precaution, there would be discordance between the order in which the successive plans of the subject appear and the exact perspective thereof. In other words, it is necessary, in the particular case of X-ray photography in relief, to occasion pseudoscopy intentionally for obtaining an orthoscopic X-ray photograph in relief which I have called "Selecto-radiogram."

It is quite obvious that the device described is capable of being carried out in very different ways, without the principle of its operation being modified thereby. The example of a horizontal apparatus has been chosen, but nothing prevents the construction of a similar vertical device, whilst remaining in accordance with the invention. Without departing from its scope, the establishment of a plant can also be contemplated, for obtaining peri-stereoscopic images or X-ray photographs of larger objects, and even of persons, placed on a platform rotating about a vertical axis, and rendered rotationally rigid with the frame receiving the sensitive plate and the selectograph.

The apparatus may also be supplemented by auxiliary devices, for instance field lenses or other optical means modifying in a definite direction the path of the rays between the object and the plate, and suitable electrical apparatus may moreover ensure the stoppage at the desired moment of the simultaneous rotation of the movable parts, and the automatic obturation and extinguishing of the source of light or of the Röntgen lamp.

Having now particularly described and ascertained the nature of my said invention and in what manner the same is to be performed, I declare that what I claim is:

1. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for a frame containing a sensitive plate covered by a selective screen located at the other end of the camera, said frame being adapted to pivot round an axis parallel to the pivoting axis of said first support, and control means for imparting simultaneously a synchronized pivoting motion to both supports.

2. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for a frame containing a superposed sensitive plate and selecting means located at the other end of the camera, said frame being adapted to pivot round an axis parallel to the pivoting axis of said first support, a variable transmission connecting the two supports, and control means for imparting a synchronized pivoting motion to said supports.

3. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for a frame containing a superposed sensitive plate and selecting screen located at the other end of the camera, said frame being adapted to pivot round an axis parallel to the pivoting axis of said first support, a variable and reversible transmission connecting the two supports, and control means for imparting a synchronized pivoting motion to said supports.

4. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for carrying a superposed sensitive plate and selecting screen located at the other end of the camera and adapted to pivot round an axis parallel to the pivoting axis of said first support, a system adapted to pivot round a third axis parallel to the two first pivoting axes, a variable and reversible gearing connecting said second support and said system, and means for imparting an equal angular pivotal motion to said first support and to said system.

5. In an apparatus as claimed in claim 4, the provision of means for illuminating the object, carried by said first support.

6. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for carrying a superposed sensitive plate and selecting screen located at the other end of the camera and adapted to pivot round an axis parallel to the pivoting axis of said first support, a parallel motion constituted by two parallel rocking levers and two parallel rods pivotally secured to said levers, means whereby angular motion of said rocking levers is adapted to impart angular pivotal motions, at a constant predetermined ratio, to the two supports respectively, and means whereby to and fro motions of opposite directions are given to the parallel rods of the parallel motion.

7. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for carrying a superposed sensitive plate and selecting screen located at the other end of the camera and adapted to pivot round an axis parallel to the pivoting axis of the first support, a parallel motion constituted by two parallel rocking levers and two parallel rods pivotally secured to said levers, one of the rocking levers being adapted to pivot integrally with one of said supports, means whereby the other rocking lever is adapted to transmit a pivotal motion to the other support with a variable and reversible gear ratio, and means for giving to and fro motions of opposite directions to the parallel rods of the parallel motion.

8. An arrangement for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for carrying a superposed sensitive plate and selecting screen located at the other end of the camera and adapted to pivot round an axis parallel to the pivoting axis of the first support, an arrangement adapted to pivot round a third axis parallel to the two first pivoting axes, two stepped pulleys rigid respectively with the second support and with said arrangement, a belt connecting the steps on said pulleys which correspond to the desired gear ratio, and means for imparting simultaneously a pivoted motion to the first support and to the pivoting arrangement.

9. An apparatus for producing peristereoscopic images enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for carrying a superposed sensitive plate and selecting screen located at the other end of the camera and adapted to pivot round an axis parallel to the pivoting axis of the first support, a parallel motion consituted by two parallel rocking levers and two parallel rods pivotally secured to said levers, one of said rocking levers being adapted to pivot integrally with one of said supports, two stepped pulleys rigid respectively with the other support and with the other rocking lever, a belt connecting the steps on the two pulleys in accordance with the gear ratio required, and means for giving to and fro motions of opposite directions to the parallel rods of the parallel motion.

10. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, a second support for carrying a superposed sensitive plate and selecting screen located at the other end of the camera and adapted to pivot round an axis parallel to the pivoting axis on the first support, a parallel motion consituted by two parallel rocking levers and two parallel rods pivotally secured to said levers, means for adjusting the length of the parallel rods between the rocking levers, means whereby angular motion of rocking levers is adapted to impart angular pivotal motions at a constant predetermined ratio to the two supports respectively, and means whereby to and fro motions of opposite directions are given to the parallel rods of the parallel motion.

11. In an apparatus as claimed in claim 1, for producing enlargements and reductions of peristereoscopic images, particularly applicable to macrophotography, the provision of an auxiliary support, adapted to be placed on said first support, illuminating means carried thereby, and a frame for a composite image plate and an optical selecting screen, superposed in said frame, said frame being adapted to be carried by said auxiliary support, at a longitudinally adjustable point thereof.

12. An apparatus for producing peristereoscopic images, enlargements and reductions thereof, particularly applicable to macrophotography, comprising a stationary photographic camera including a lens, a first support for the object to be photographed located in front of the camera lens and adapted to pivot round an axis perpendicular to the optical axis of the camera, an auxiliary support, adapted to be placed on said object support when the apparatus is used for enlargements and reductions, illuminating means carried thereby, and a frame for a composite image plate and an optical selecting net superposed in said frame, said frame being adapted to be carried by said auxiliary support, at a longitudinally adjustable point thereof, a second support for the superposed sensitive plate and selecting net located at the other end of the camera and adapted to pivot round an axis parallel to the pivoting axis of the first support, a parallel motion constituted by two parallel rocking levers, and two parallel rods pivotally secured to said levers, one of said rocking levers being adapted to pivot integrally with one of the operative supports, means whereby the other rocking lever is adapted to transmit a pivotal motion to the other support with a variable and reversible gear ratio, and means for giving to and fro motions of opposite directions to the parallel rods of the parallel motion.

13. An apparatus for producing selectoradiographic pictures, comprising a stationary photographic camera including a lens, a comparatively large support for the subject to be radiographed, arranged in front of the camera lens and adapted to pivot round an axis perpendicular to the optical axis of the camera, X-ray illuminating means carried by said support beyond the location of the subject, a non-pivoting fluorescent screen between the lens and said pivoting support, a second support for carrying a superposed sensitive plate and selecting screen located at the other end of the camera and adapted to pivot round an axis parallel to the pivoting axis of the first support, and control means for imparting simultaneous pivoting motions of opposite directions to the two supports.

14. An apparatus for producing selectoradiographic pictures comprising a stationary photographic camera including a lens, a comparatively large support for the subject to be radiographed, arranged in front of the lens and adapted to pivot round an axis perpendicular to the optical axis of the camera, X-ray illuminating means carried by said support beyond the location of the subject, a second support for carrying a superposed sensitive plate and selecting screen located at the other end of the camera and adapted to pivot round an axis parallel to the pivoting axis of the first support, a parallel motion constituted by two parallel rocking levers and two parallel rods pivotally secured to said levers, one of the rocking levers being adapted to pivot integrally with one of the supports, two stepped pulleys rigid respectively with the other support and with the other rocking lever, a crossed belt passing over said belts, and means for giving to and fro motions of opposite directions to the parallel rods of the parallel motion.

MAURICE BONNET.

REFERENCES CITED

The following references are of record in the file of this patent:

UNITED STATES PATENTS

| Number | Name | Date |
| --- | --- | --- |
| 1,382,978 | Hopkins | June 28, 1921 |
| 2,002,090 | Ives | May 21, 1935 |
| 2,150,932 | McDonnell | Mar. 21, 1939 |
| 2,158,660 | Kanolt | May 16, 1939 |
| 2,175,114 | Friedmann et al. | Oct. 3, 1939 |